United States Patent
Vuillaume

(10) Patent No.: US 12,393,667 B2
(45) Date of Patent: Aug. 19, 2025

(54) COMPUTING DEVICE FOR CHECKING A SOFTWARE KEY

(71) Applicant: Robert Bosch GmbH, Stuttgart (DE)

(72) Inventor: Camille Germain Vuillaume, Tokyo (JP)

(73) Assignee: ROBERT BOSCH GMBH, Stuttgart (DE)

( * ) Notice: Subject to any disclaimer, the term of this patent is extended or adjusted under 35 U.S.C. 154(b) by 161 days.

(21) Appl. No.: 18/476,128

(22) Filed: Sep. 27, 2023

(65) Prior Publication Data

US 2024/0220597 A1 Jul. 4, 2024

(30) Foreign Application Priority Data

Dec. 29, 2022 (DE) .................. 10 2022 214 429.5

(51) Int. Cl.
*G06F 21/44* (2013.01)
(52) U.S. Cl.
CPC .................................. *G06F 21/44* (2013.01)
(58) Field of Classification Search
CPC ................................ G06F 21/44; G06F 21/46
See application file for complete search history.

(56) References Cited

U.S. PATENT DOCUMENTS

| | | | |
|---|---|---|---|
| 6,349,318 B1 | 2/2002 | Vanstone et al. | |
| 8,005,210 B2 * | 8/2011 | Ozturk | H04L 9/3066 708/492 |
| 8,532,286 B2 * | 9/2013 | Lambert | H04L 9/30 380/28 |
| 2009/0245507 A1 * | 10/2009 | Vuillaume | G06F 7/72 380/28 |

FOREIGN PATENT DOCUMENTS

| | | | | |
|---|---|---|---|---|
| CN | 109586893 A | * | 4/2019 | H04L 9/003 |
| WO | WO-2023277921 A1 | * | 1/2023 | B60R 25/24 |

OTHER PUBLICATIONS

Adalier, Mehmet, and Antara Teknik. "Efficient and secure elliptic curve cryptography implementation of curve p-256." Workshop on elliptic curve cryptography standards. vol. 66. No. 446. NIST, 2015. (Year: 2015).*

* cited by examiner

*Primary Examiner* — Kostas J Katsikis
(74) *Attorney, Agent, or Firm* — NORTON ROSE FULBRIGHT US LLP

(57) ABSTRACT

A computing device configured to check a software key of a user terminal device. The computing device includes: an ALU, a plurality of registers having a storage capacity of at least x bits, and a data memory. The computing device is configured to perform a multiplication of two y-bit numbers each formed by a plurality of x-bit digits, as follows: loading the x-bit digits of the y-bit numbers into the registers, and repeatedly calculating, using the ALU, for all x-bit digits of the result of the multiplication of the y-bit numbers, an x-bit digit of the result based on those registers that store the associated x-bit digits of the y-bit numbers, and storing the calculated x-bit digit of the result in the data memory. Y is an integer multiple of x.

9 Claims, 4 Drawing Sheets

COMPUTING DEVICE FOR CHECKING A SOFTWARE KEY

CROSS REFERENCE

The present application claims the benefit under 35 U.S.C. § 119 of German Patent Application No. DE 10 2022 214 429.5 filed on Dec. 29, 2022, which is expressly incorporated herein by reference in its entirety.

BACKGROUND INFORMATION

The present invention relates to a computing device. The computing device is provided to test a software key.

It is conventional in the related art to test a digital key, for example a digital car key. For example, Elliptic Curve Cryptography (ECC) is described in the related art as an asymmetric cryptosystem. Elliptic curve cryptography is becoming increasingly important in the related art because it provides the same level of security as other cryptosystems, such as the RSA (Rivest-Shamir-Adleman) cryptosystem, while using significantly shorter bit lengths. This allows higher efficiency and lower memory requirements.

The building blocks of ECC are modulo multiplications. When common elliptic curves such as the NIST curve P-256 are implemented, modulo multiplication typically takes place in two steps. First, a multiplication is calculated and subsequently the result is reduced by modulo calculation based on a prime number.

Computer architectures are available that benefit from high-speed accelerators to compute large integer arithmetic, as is described, for example, in U.S. Pat. No. 6,349,318 B1. However, this is not always the case, especially in embedded microcontrollers.

SUMMARY

According to an example embodiment of the present invention, the computing device enables a checking of a digital key without the need for large hardware requirements. The computing device can thus be manufactured simply and inexpensively. At the same time, the calculations required to check the digital key can be performed reliably.

According to an example embodiment of the present invention, the computing device is designed to check a digital key of a user terminal device. In particular, the computing device is designed to check digital keys in a keyless vehicle access system. In particular, the vehicle access system is designed to open and lock a vehicle via a user terminal device, preferably a mobile telephone. Particularly advantageously, the computing device is an embedded microcontroller that can perform calculations quickly to provide a high-quality user experience when using the computing device.

According to an example embodiment of the present invention, the computing device has an arithmetic logic unit, a multiplicity of registers, and a data memory. The registers are used in particular for short-term storage of data with fast access by the arithmetic logic unit, whereas the data memory is provided in particular for longer-term storage, compared with the registers. The registers each have a storage capacity of at least x bits.

According to an example embodiment of the present invention, the computing device is designed to perform a multiplication of two y-bit numbers each formed by a plurality of x-bit digits. In other words, the y-bit number is represented by a plurality of x-bit numbers, where each x-bit number represents one digit of the y-bit number. For example, a 4-bit number can be represented by two 2-bit numbers, each representing one digit of the 4-bit number. For example, the 4-bit number 1101 has the two 2-bit numbers 11 and 01 as digits or the four 1-bit numbers 1, 1, 0, and 1 as digits.

For said multiplication, according to an example embodiment of the present invention, the computing device is designed to first load the x-bit digits of the y-bit numbers into the registers. It can be seen that in this way no y-bit registers, but only x-bit registers, are necessary to handle the y-bit numbers. Further, the computing device is designed to repeatedly calculate, using the arithmetic logic unit, for all x-bit digits of the result of the multiplication of the y-bit numbers, an x-bit digit of the result based on those registers that store the corresponding x-bit digits of the y-bit numbers, and to store the calculated x-bit digit of the result in the data memory. Here it is provided that y is an integer multiple of x.

Thus, the multiplication using the registers takes place separately for the individual digits of the y-bit number. This simplifies the hardware requirements, because smaller registers can be used. The calculation is performed by a plurality of registers; here finished results no longer have to be stored in the registers and can therefore be moved into the data memory. However, by using the registers, it is then not necessary to read out data necessary for multiplication from the data memory, thus minimizing the speed of the multiplication calculation. The data from the data memory can then be outputted as the result of the multiplication.

Preferred developments of the present invention are disclosed herein.

For the calculation of the multiplication, a first number a is represented by the digits $a_3 a_2 a_1 a_0$ and a second number b is represented by the digits $b_3 b_2 b_1 b_0$. According to an example embodiment of the present invention, the computing device is preferably designed to produce, by the arithmetic logic unit, a first intermediate result $z_1$ with the digits $t_0 c_0$ on the basis of the following schema, and to store $c_0$ in the data memory:

$$t_0 c_0 = a_0 * b_0$$

In this way, a smallest digit, namely the digit $c_0$ of the result, is calculated. The additionally calculated digit $t_0$, in contrast, is not yet the final result at the corresponding position. Therefore, the computing device is designed to calculate, with the arithmetic logic unit, a second intermediate result $z_2$ with the digits $t_2 t_1 c_1$ on the basis of the following schema and to store $c_1$ in the data memory:

$$t_2 t_1 c_1 = t_0 + a_0 * b_1 + a_1 * b_0$$

In this way another digit, the digit $c_1$, is calculated. The computing device is further designed to calculate, with the arithmetic logic unit, a third intermediate result $z_3$ with the digits $t_4 t_3 c_2$ on the basis of the following schema and to store $c_2$ in the data memory:

$$t_4 t_3 c_2 = t_2 t_1 + a_0 * b_2 + a_1 * b_1 + a_2 * b_0$$

In addition, the computing device is designed to calculate, with the arithmetic logic unit, a fourth intermediate result $z_4$ with the digits $t_6 t_5 c_3$ on the basis of the following schema and to store $c_3$ in the data memory:

$$t_6 t_5 c_3 = t_4 t_3 + a_0 * b_3 + a_1 * b_2 + a_2 * b_1 + a_3 * b_0$$

Likewise, the computing device is designed to calculate, with the arithmetic logic unit, a fifth intermediate result $z_5$ with the digits $t_8 t_7 c_4$ on the basis of the following schema, and to store $c_4$ in the data memory:

$$t_8 t_7 c_4 = t_6 t_5 + a_1 * b_3 + a_2 * b_2 + a_3 * b_1$$

Furthermore, the computing device is designed to calculate, with the arithmetic logic unit (100), a sixth intermediate result $z_6$ with the digits $t_{10} t_9 c_5$ on the basis of the following schema and to store $c_5$ in the data memory:

$$t_{10} t_9 c_5 = t_8 t_7 + a_2 * b_3 + a_3 * b_2$$

Finally, the computing device is designed to calculate, with the arithmetic logic unit (100), a seventh intermediate result $z_7$ with the digits $c_7 / c_6$ on the basis of the following schema and to store $c_7 c_6$ in the data memory:

$$c_7 c_6 = t_{10} t_9 + a_3 * b_3$$

Thus, the result c of the multiplication of a and b is represented by the digits $c_7 c_6 c_5 c_4 c_3 c_2 c_1 c_0$ and is stored in the data memory. The result of the multiplication of a and b can thus be retrieved from the data memory. To calculate the multiplication, registers were required that are smaller than the length or size of the numbers to be multiplied. This simplifies the hardware requirements made on the computing device.

According to an example embodiment of the present invention, preferably, it is provided that at least the respective digits of the second intermediate result, the third intermediate result, the fourth intermediate result, the fifth intermediate result, and the sixth intermediate result are stored in the same registers. These registers are also called accumulators. In this case, the computing device is set up to use the register that stores a lowest digit of an intermediate result to store a highest digit of the subsequent intermediate result. This process is also called rotation of the accumulators. This rotation allows the values stored in the accumulators to be reused as long as is necessary for subsequent calculations. Only the accumulator which has the value representing the currently smallest or lowest digit of the result is overwritten in a subsequent step, the content of the accumulator being previously transferred to the data memory as result. The accumulator is then overwritten with the highest digit of the intermediate result. Due to the rotation of the accumulators, data shifting processes are thus avoided on the one hand, and the number of registers is minimized on the other hand.

According to an example embodiment of the present invention, preferably, the computing device is designed to load only the three lowest digits of the first number a or the second number b, respectively, into the registers for the computation of the first intermediate result, the second intermediate result, and the third intermediate result. As a result, again, fewer registers are required. Nonetheless, the calculation of the multiplication can be started.

Particularly preferably, according to an example embodiment of the present invention, for calculating the fourth intermediate result, the fifth intermediate result, the sixth intermediate result and the seventh intermediate result, the computing device is designed to load the respective highest digit of the first number a or the second number b, which is not loaded into the registers for the calculation of the preceding intermediate results, into the register in which the lowest digit of the same number is stored. Thus, although it is necessary to load data from the data memory during the calculation of the multiplication, a register can be dispensed with. For the calculation of the fourth intermediate result, the fifth intermediate result, the sixth intermediate result, and the seventh intermediate result, the mentioned lowest digit is no longer required, and thus the associated register can be overwritten. It is thus possible, easily and with low outlay, to perform the calculation of the multiplication with fewer registers than the total number of digits of the first number and the second number.

Squaring a number is a special form of multiplication. In this case, the first number and the second number are identical. In this case, it is provided that the multiplication is a squaring of a number a, represented by the digits $a_3 a_2 a_1 a_0$. The computing device is preferably designed to calculate, with the arithmetic logic unit, a first intermediate result $z_1$ with the digits $t_0 c_0$ on the basis of the following schema and to store $c_0$ in the data memory:

$$t_0 c_0 = a_0 * a_0$$

Again, a smallest or lowest digit of the result is thus calculated. Furthermore, the computing device is designed to calculate, with the arithmetic logic unit, a second intermediate result $z_2$ with the digits $t_2 t_1 c_1$ on the basis of the following schema and to store $c_1$ in the data memory:

$$t_2 t_1 c_1 = t_0 + 2 * a_0 * a_1$$

In this way, a next-smallest or next-lowest digit is calculated. The computing device is further designed to calculate, with the arithmetic logic unit, a third intermediate result $z_3$ with the digits $t_4 t_3 c_2$ on the basis of the following schema and to store $c_2$ in the data memory:

$$t_4 t_3 c_2 = t_2 t_1 + 2 * a_0 * a_2 + a_1 * a_1$$

Furthermore, the computing device is designed to calculate, with the arithmetic logic unit, a fourth intermediate result $z_4$ with the digits $t_6 t_5 c_3$ on the basis of the following schema and to store $c_3$ in the data memory:

$$t_6 t_5 c_3 = t_4 t_3 + 2 * (a_0 * a_3 + a_1 * a_2)$$

Furthermore, the computing device is designed to calculate, with the arithmetic logic unit, a fifth intermediate result $z_5$ with the digits $t_8 t_7 c_4$ on the basis of the following schema and to store $c_4$ in the data memory:

$$t_8 t_7 c_4 = t_6 t_5 + 2 * a_1 * a_3 + a_2 * a_2$$

In addition, the computing device is designed to calculate, with the arithmetic logic unit, a sixth intermediate result $z_6$ with the digits $t_{10} t_9 c_5$ on the basis of the following schema and to store $c_5$ in the data memory:

$$t_{10} t_9 c_5 = t_8 t_7 + 2 * a_2 * a_3$$

Finally, the computing device is designed to calculate, with the arithmetic logic unit, a seventh intermediate result $z_7$ with the digits $c_7 c_6$ on the basis of the following schema and to store $c_7 c_6$ in the data memory:

$$c_7 c_6 = t_{10} t_9 + a_3 * a_3$$

The result c of the squaring of a is represented by the digits $c_7 c_6 c_5 c_4 c_3 c_2 c_1 c_0$ and stored in the data memory. The result can thus be read out from the data memory at any time. The calculation is fast and reliable, requiring only a minimum number of registers.

Advantageously, according to an example embodiment of the present invention, it is provided that x=32 bits and y=128 bits. The calculation in particular of multiplications of numbers with sizes of at least 128 bits has until now required very complex hardware, the calculation being done reliably and quickly by the computing device without making any special hardware requirements.

The present invention also relates to a further computing device. The computing device allows a checking of a digital key without requiring large hardware demands. The computing device can thus be manufactured simply and inexpensively. At the same time, the calculations required to check the digital key can be performed reliably.

According to an example embodiment of the present invention, the computing device is designed to check a digital key of a user terminal device. In particular, the computing device is designed to check digital keys in a keyless vehicle access system. In particular, the vehicle access system is designed to open and lock a vehicle via a user terminal device, preferably a mobile telephone. Particularly advantageously, the computing device is an embedded microcontroller that can perform calculations quickly to provide a high-quality user experience when using the computing device.

According to an example embodiment of the present invention, the computing device has an arithmetic logic unit, a multiplicity of registers, and a data memory. The registers are used in particular for short-term storage of data with fast access by the arithmetic logic unit, whereas the data memory is provided in particular for longer-term storage, compared with the registers. The registers each have a storage capacity of at least 32 bits.

According to an example embodiment of the present invention, the computing device is designed to calculate a remainder of aA division of a 512-bit number, formed by the 32-bit digits $a_{15} a_{14} a_{13} a_{12} a_{11} a_{10} a_9 a_8 a_7 a_6 a_5 a_4 a_3 a_2 a_1 a_0$, with the 256-bit divisor P256, where $P256 = 2^{256} - 2^{224} + 2^{192} + 2^{96} - 1$ holds. The number P256 is a prime number and in particular is the base of the NIST elliptic curve P-256.

According to an example embodiment of the present invention, the computing device is designed to load the 32-bit digits of the 512-bit number into the registers and, with the arithmetic logic unit, to repeatedly calculate the remainder of the division using the following schema and to store s as the result in the data memory:

$$s = s_0 + 2 s_1 + 2 s_2 + s_3 + s_4 - s_5 - s_6 - s_7 - s_8$$

where the auxiliary numbers $s_0, s_0, s_1, s_2, s_3, s_4, s_5, s_6, s_7, s_8$ have the following digits:

$$s_0 = (a_7\ a_6\ a_5\ a_4\ a_3\ a_2\ a_1\ a_0)_{32}$$

$$s_1 = (a_{15}\ a_{14}\ a_{13}\ a_{12}\ a_{11}\ 0\ 0\ 0)_{32}$$

$$s_2 = (0\ a_{15}\ a_{14}\ a_{13}\ a_{12}\ 0\ 0\ 0)_{32}$$

$$s_3 = (a_{15}\ a_{14}\ 0\ 0\ 0\ a_{10}\ a_9\ a_8)_{32}$$

$$s_4 = (a_8\ a_{13}\ a_{15}\ a_{14}\ a_{13}\ a_{11}\ a_{10}\ a_9)_{32}$$

$$s_5 = (a_{10}\ a_8\ 0\ 0\ 0\ a_{13}\ a_{12}\ a_{11})_{32}$$

$$s_6 = (a_{11}\ a_9\ 0\ 0\ a_{15}\ a_{14}\ a_{13}\ a_{12})_{32}$$

$$s_7 = (a_{12}\ 0\ a_{10}\ a_9\ a_8\ a_{15}\ a_{14}\ a_{13})_{32}$$

$$s_8 = (a_{13}\ 0\ a_{11}\ a_{10}\ a_9\ 0\ a_{15}\ a_{14})_{32}$$

Preferably, according to an example embodiment of the present invention, the computing device is designed to determine, with a register used as an auxiliary register, that the result s is greater than P256 and to repeatedly perform the subtraction s=s−P256 until the result s is smaller than P256. In particular, the auxiliary register is a control register for monitoring carries during the calculation of the result s according to the schema $s=s_0+2s_1+2_2+s_3+s_4-s_5s-s_6-s_7-s_8$. Alternatively or additionally, the computing device is designed to determine, with a register used as an auxiliary register, that the result s is a negative number and to perform the addition s=s+P256 repeatedly until the result s is a positive number. In particular, the auxiliary register is again a control register for monitoring carries during the calculation of the result s. These corrections make it possible to ensure a result s that is not negative and not greater than the prime number P256 and thus corresponds to a valid modulo calculation.

The computing device according to one of the previously described embodiments of the present invention preferably includes a non-volatile memory. The non-volatile memory is for example a flash memory. The non-volatile memory is used to store program data, whereby the computing device is designed to calculate a remainder of a division and/or a multiplication and/or a squaring. In particular, the non-volatile memory is used to store implementations that form the computing device to the features described above.

BRIEF DESCRIPTION OF THE DRAWINGS

In the following, exemplary embodiments of the present invention are described in detail with reference to the figures.

DETAILED DESCRIPTION OF EXAMPLE EMBODIMENTS

Figure 1:
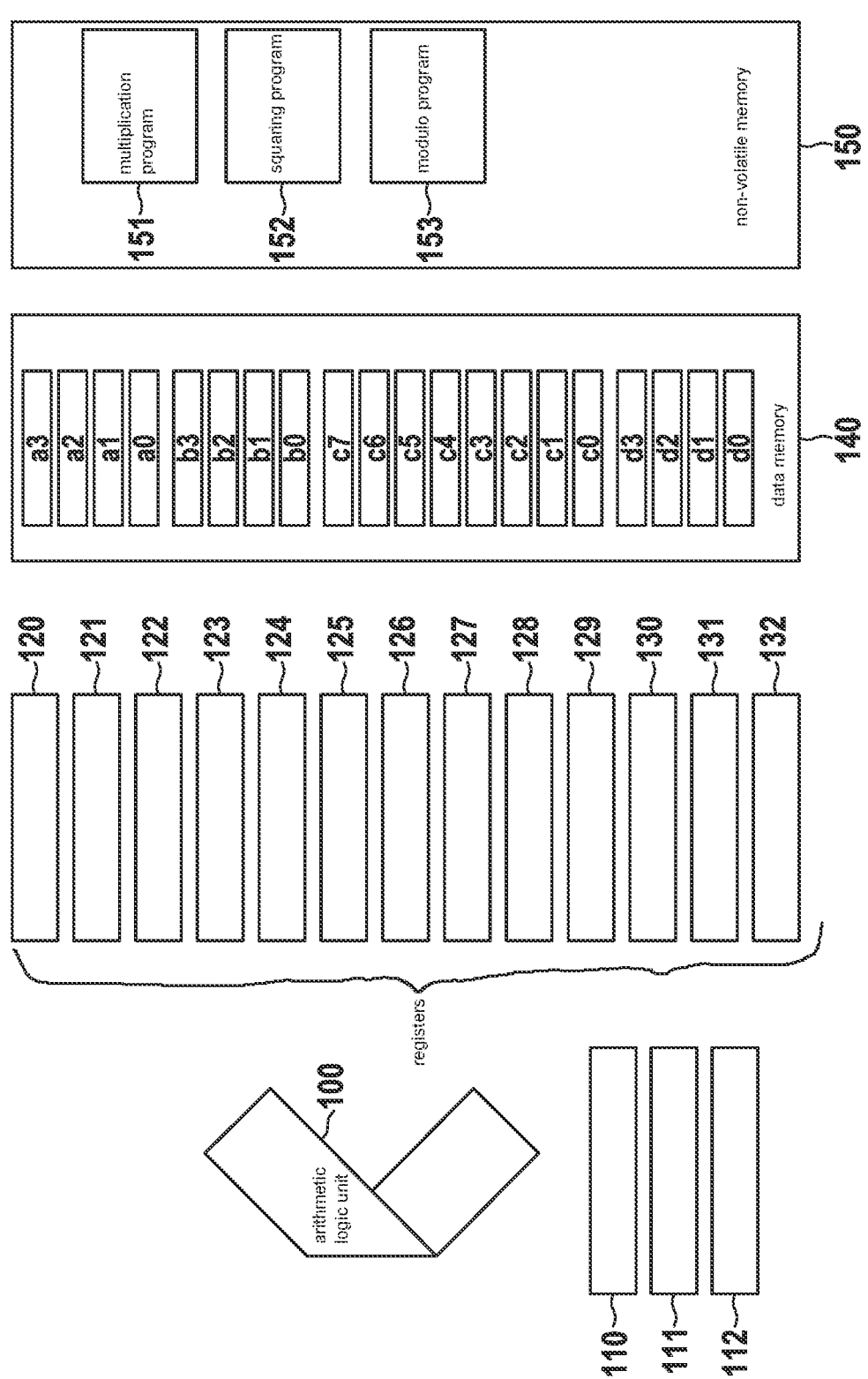
FIG. 1 shows a schematic diagram of the computing device according to an exemplary embodiment of the present invention.

FIG. 1 schematically shows a computing device 1 according to an exemplary embodiment of the present invention. For example, the computing device 1 is a microcontroller. The computing device has an arithmetic logic unit 100, also called an arithmetic logical unit, abbreviated ALU, and a plurality of registers 120, ..., 132 having for example 32 bits. A data storage device 140 is also provided. The data memory 140 is in particular a working memory, also called "random access memory," abbreviated RAM, of the computing device 1, and is thus in particular a volatile memory. In particular, the data memory 140 is used to store input values and/or output values. As examples, locations a0 to a3, b0 to b3, c0 to c7, and d0 to d7 in data memory 140 are shown.

For example, thirteen such registers 120, ..., 132 are provided, which can be used as freely usable or general purpose registers, abbreviated GPR, for various tasks. Such tasks include, in particular, memory accesses, the storing of input values for arithmetic logic unit 100, and the storing of results from arithmetic logic unit 100. Typically, computing device 1 has a stack pointer, which is a register 120, ..., 132 in which a RAM address is stored, in which a memory stack is located.

Furthermore, computing device 1 typically has a control register that stores data relating to the last operation of arithmetic logic unit 100. In particular, a carry bit of a previous addition is stored here. Furthermore, in particular a program counter is provided, which is preferably a register containing the address of a program currently being executed.

Furthermore, computing device 1 preferably includes a non-volatile memory 150, such as a flash memory. Programs of computing device 1 are stored on non-volatile memory 150. In this embodiment, as an example three programs are stored that are explained with reference to FIGS. 2 to 4. Thus, a multiplication program 151 is provided which is explained with reference to FIG. 2, a squaring program 152 is provided which is explained with reference to FIG. 3, and a modulo program 153 is provided which is explained with reference to FIG. 4. Through these programs 151, 152, 153, the computing device 1 is designed to perform different calculations.

Figure 2:
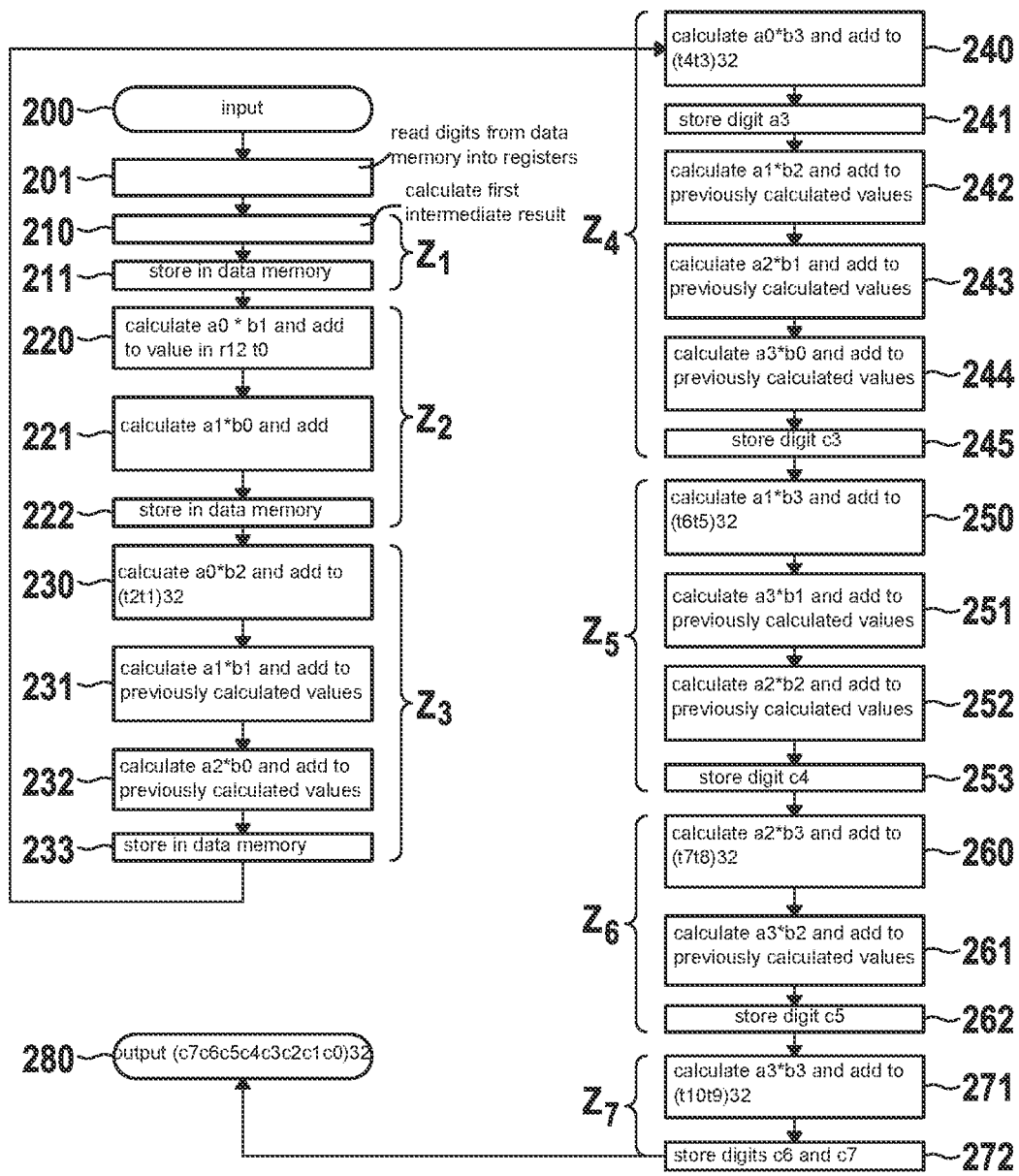
FIG. 2 shows a schematic flow chart of a multiplication calculation by the computing device according to an example embodiment of the present invention.
Figure 3:
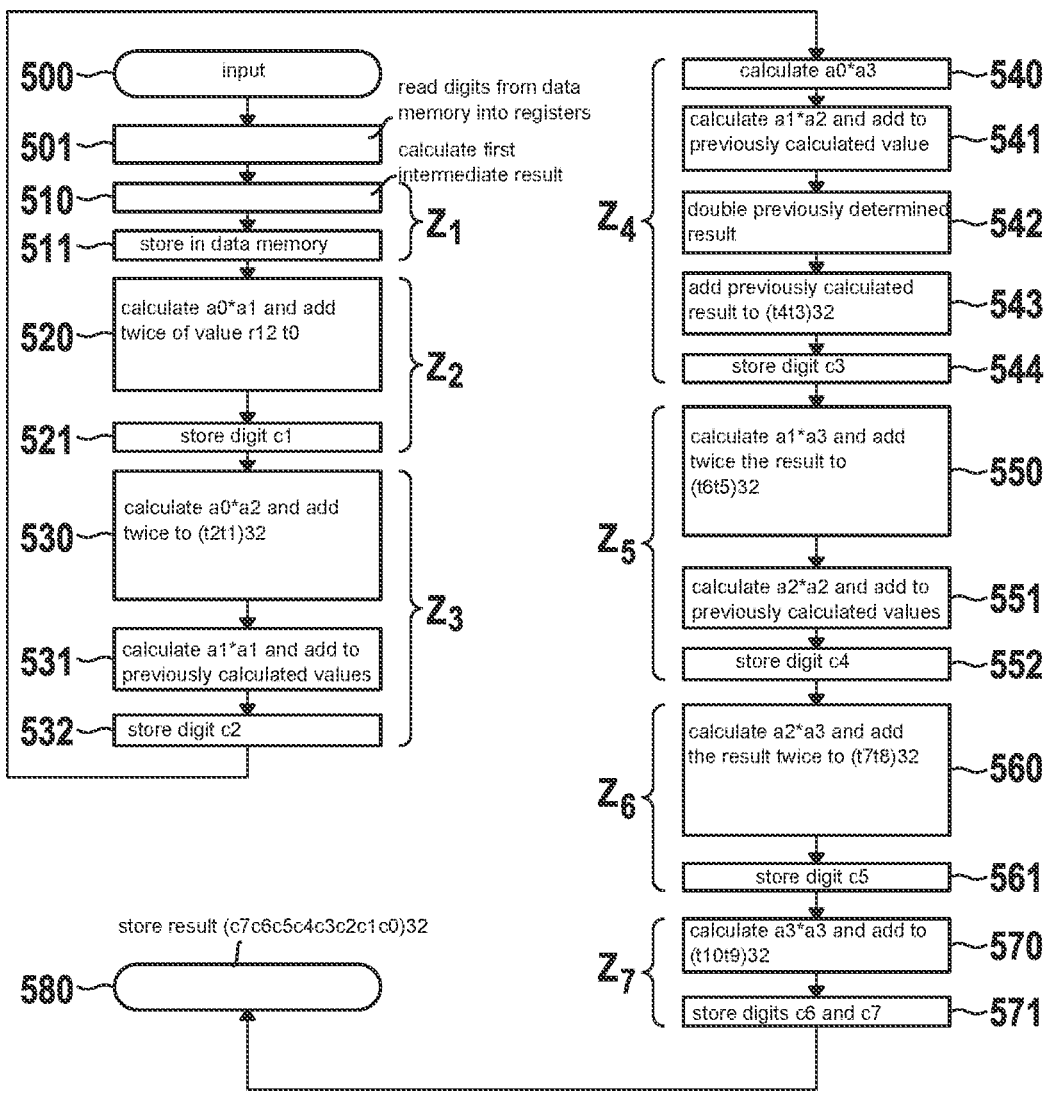
FIG. 3 shows a schematic flow chart of a square calculation by the computing device according to an example embodiment of the present invention.

FIG. 2 schematically shows the sequence of multiplication program 151. This program allows a multiplication of a first number a with the digits $a_3a_2a_1a_0$ and a second number with the digits $b_3b_2b_1b_0$. The first number a and the second number b are 128 bit numbers each having four 32 bit digits. Thirteen registers 120, ..., 132 are used for this purpose.

The individual digits of the numbers to be multiplied, i.e. the values $a_3$, $a_2$, $a_1$, $a_0$, $b_3$, $b_2$, $b_1$, $b_0$, are stored in data memory 140 and are used as input 200 of the multiplication program 151. In a first step 201, each of these digits is read from data memory 140 into a respective register 120, ..., 132, the registers 120, ..., 132 being designated r1 to r13 in the following:

$$r2 = a_0, r3 = a_1, r4 = a_2$$
$$r5 = b_0, r6 = b_1, r7 = b_2, r8 = b_3,$$

Since the digit $a_3$ is not required until later, this digit is not loaded into a register 120, ..., 132 at this time. This minimizes the number of required registers 120, ..., 132.

The calculation of the multiplication takes place in such a way that through the individual digits of the two numbers a, b, a plurality of intermediate results $z_1, \ldots, z_7$ are ascertained. These intermediate results $z_1, \ldots, z_7$ enable a calculation of the digits of the result c of the multiplication.

The arithmetic logic unit 100 performs the following calculation steps, which are reproduced below as pseudocode. Here the following are meant:

ADD (u, v): The contents of registers u and v are added.

ADDX (u, v): The contents of registers u and v are added with carry. If the size of the register overflows due to a previous arithmetic operation, the value 1 is stored in a control register, otherwise the value 0. This value is added additionally during the ADDX operation.

MULT (u, v): The contents of registers u and v are multiplied.

In a second step 210, the arithmetic logic unit 100 is used to calculate a first intermediate result $z_1$ with the digits $t_0c_0$ on the basis of the following schema $(t_0c_0)_{32}=a_0*b_0$:

$$r12, r11 = MULT(r2, r5)$$

The first intermediate result $z_1$ already has a digit of the final result c, namely the digit $c_0$. Therefore, in a third step 211, this result is stored in data memory 140, here as an example at the location c0:

c0=r11

After this, using arithmetic logic unit 100 a second intermediate result $z_2$ is calculated with the digits $t_2t_1c_1$ using the schema $(t_2t_1c_1)_{32}=t_0+a_0+b_1+a_1*b_0$. For this purpose, first in a fourth step 220 the calculation $a_0*b_1$ is carried out and is added to the value in r12 $t_0$:

$$r10, r9 = MULT(r2, r6)$$
$$r12 = ADD(r9, r12)$$
$$r13 = ADDX(r10, 0)$$

After this, in a fifth step 221 the calculation $a_1*b_0$ is made and added to obtain the second intermediate result $z_2= (t_2t_1c_1)_{32}$:

$$r10, r9 = MULT(r3, r5)$$
$$r12 = ADD(r9, r12)$$
$$r13 = ADDX(r10, r13)$$
$$r11 = ADDX(0, 0)$$

A new allocation of r11 takes place. Previously $c_0$ was stored here; this result was intermediately stored in the data memory under c0. Therefore, r11 is now used as a representative for the highest digit of the second intermediate result $z_2$, i.e. the digit $t_2$, and is overwritten with the value "0" and any carry that there may be. After the fourth step 220 and the fifth step 221, $t_2$ is stored in r11, $t_1$ in r13 and $c_1$ in r12, so that another digit of the result c is calculated. This digit $c_1$ is stored in the data memory 140 in a sixth step 222, here as an example at the location c1:

$$c1 = r12$$

Subsequently, with the arithmetic logic unit 100, a third intermediate result $z_3$ is calculated with the digits $t_4t_3c_2$ using the schema $(t_4t_3c_2)_{32}=(t_zt_1)_{32}+a_0*b_2+a_1*b_1+a_2*b_0$. For this purpose, first the calculation $a_0*b_2$ is performed in a seventh step 230 and the result is added to $(t_2t_1)_{32}$:

$$r10, r9 = MULT(r2, r7)$$
$$r13 = ADD(r9, r13)$$
$$r11 = ADDX(r10, r11)$$
$$r12 = ADDX(0, 0)$$

Subsequently, in an eighth step 231, the calculation $a_1*b_1$ is carried out, and the addition of this to the previously calculated values is carried out:

$$r10, r9 = MULT(r4, r5)$$
$$r13 = ADD(r9, r13)$$
$$r11 = ADDX(r10, r11)$$
$$r12 = ADDX(0, r12)$$

Finally, in a ninth step 232 the calculation $a_2*b_0$ is performed and the addition to the previously calculated values is done in order to obtain the third intermediate result $z_3=(t_4t_3c_2)_{32}$:

$$r10, r9 = MULT(r3, r3)$$
$$r13 = ADD(r9, r13)$$
$$r11 = ADDX(r10, r11)$$
$$r12 = ADDX(0, r12)$$

After the ninth step 232, $t_4$ is stored in r12, $t_3$ in r11, and $c_2$ in r13, so that another digit of the result c is calculated. This digit $c_2$ is stored in the data memory 140 in a tenth step 233, here as an example at the location c2:

$$c2 = r13$$

Subsequently, the arithmetic logic unit 100 is used to calculate a fourth intermediate result $z_4$ with the digits $t_6t_5c_3$ using the schema $(t_6t_5c_3)_{32}=(t_4t_3)_{32}+a_0*b_3+a_1*b_2+a_2*b_1+a_3*b_0$. For this purpose, first the calculation $a_0*b_3$ is carried out in an eleventh step 240 and the result is added to $(t_4t_3)_{32}$:

$$r10, r9 = MULT(r2, r8)$$
$$r11 = ADD(r9, r11)$$
$$r12 = ADDX(r10, r12)$$
$$r13 = ADDX(0, 0)$$

As soon as this calculation has been performed, the digit $a_0$ stored in register r2 is no longer required. Therefore, in a twelfth step 241, the register r2 is overwritten and instead of the digit $a_0$, the digit $a_3$ is stored. This is done by accessing the data memory 140; as an example, the digit $a_3$ is stored at location a3 of the data memory 140:

$$r2 = a3$$

Subsequently, in a thirteenth step 242 the calculation $a_1*b_2$ is carried out and the addition thereof to the previously calculated values is done:

$$r10, r9 = MULT(r3, r7)$$
$$r11 = ADD(r9, r11)$$
$$r12 = ADDX(r10, r12)$$
$$r13 = ADDX(0, r13)$$

Subsequently, in a fourteenth step 243, the calculation $a_2*b_1$ is carried out and the addition thereof to the previously calculated values is made:

$$r10, r9 = MULT(r4, r6)$$
$$r11 = ADD(r9, r11)$$
$$r12 = ADDX(r10, r12)$$
$$r13 = ADDX(0, r13)$$

Subsequently, in a fifteenth step 244, the calculation $a_3*b_0$ is carried out and the addition thereof to the previously calculated values is done in order to obtain the fourth intermediate result $z_4=(t_6t_5c_3)_{32}$:

$$r10, r9 = MULT(r2, r5)$$
$$r11 = ADD(r9, r11)$$
$$r12 = ADDX(r10, r12)$$
$$r13 = ADDX(0, r13)$$

After the fifteenth step 244, $t_6$ is stored in r13, $t_5$ in r12, and $c_3$ in r11, so that another digit of the result c is calculated. This digit $c_3$ is stored in the data memory 140 in a sixteenth step 245, here as an example at location c3:

$$c3 = r11$$

Subsequently, arithmetic logic unit 100 is used to calculate a fifth intermediate result $z_5$ with the digits $t_8 t_7 c_4$ using the schema $(t_8 t_7 c_4)_{32} + a_1 * b_3 + a_2 b_2 + a_3 * b_1$. For this purpose, in a seventeenth step 250 first the calculation $a_1 * b_3$ is carried out, and the result is added to $(t_6 t_5)_{32}$ $$r10, r9 = MULT(r3, r8)$$
$$r12 = ADD(r9, r12)$$
$$r13 = ADDX(r10, r13)$$
$$r11 = ADDX(0, 0)$$

Subsequently, in an eighteenth step 251, the calculation $a_3 * b_1$ is done and the addition thereof to the previously calculated values is carried out:

$$r10, r9 = MULT(r2, r5)$$
$$r12 = ADD(r9, r12)$$
$$r13 = ADDX(r10, r13)$$
$$r11 = ADDX(0, r11)$$

Subsequently, in a nineteenth step 252 the calculation $a_2 * b_2$ is carried out and the addition thereof to the previously calculated values is carried out in order to obtain the fifth intermediate result $z_5 = (t_8 t_7 c_4)_{32}$:

$$r10, r9 = MULT(r4, r7)$$
$$r12 = ADD(r9, r12)$$
$$r13 = ADDX(r10, r13)$$
$$r11 = ADDX(0, r11)$$

After the nineteenth step 252, $t_8$ s stored in r11, $t_7$ in r13, and $c_4$ in r12, so that another digit of the result c is calculated. This digit $c_4$ is stored in data memory 140 in a twentieth step 253, here as an example at the location c4:

$$c4 = r12$$

Subsequently, arithmetic logic unit 100 is used to calculate a sixth intermediate result 76 with the digits $t_{10} t_9 t_5$ using the schema $(t_{10} t_9 c_5)_{32} = (t_8 t_7)_{32} + a_2 * b_3 + a_3 * b_2$. For this purpose, first the calculation $a_2 * b_3$ is performed in a twenty-first step 260 and the result is added to $(t_7 t_8)_{32}$:

$$r10, r9 = MULT(r4, r8)$$
$$r13 = ADD(r9, r13)$$
$$r11 = ADDX(r10, r11)$$
$$r12 = ADDX(0, 0)$$

Subsequently, in a twenty-second step 261 the calculation $a_3 * b_2$ is made and the addition thereof to the previously calculated values is done in order to obtain the sixth intermediate result $z_6 = (t_{10} t_9 c_5)_{32}$:

$$r10, r9 = MULT(r2, r7)$$
$$r13 = ADD(r9, r13)$$
$$r11 = ADDX(r10, r11)$$
$$r12 = ADDX(0, r12)$$

After the twenty-second step 261, $t_{10}$ is stored in r12, $t_9$ in r11, and $c_5$ in r13, so that another digit of the result c is calculated. This digit $c_5$ is stored in data memory 140 in a twenty-third step 262, here as an example at location c5:

$$c5 = r13$$

Subsequently, with the arithmetic logic unit 100 a seventh intermediate result $z_7$ is calculated with the digits $c_7 c_6$ using the schema $(c_7 c_6)_{32} = (t_{10} t_9)_{32} + a_3 * b_3$. Thus, in a twenty-fourth step 271 there takes place a calculation of $a_3 * b_3$ and the subsequent addition to $(t_{10} t_9)_{32}$:

$$r10, r9 = MULT(r2, r5)$$
$$r11 = ADD(r9, r13)$$
$$r12 = ADDX(r10, r11)$$

Subsequently, $c_6$ is stored in r11 and $c_7$ in r12, so that in a final, twenty-fifth step 272 these digits $c_6$ and $c_7$ are stored in data memory 140, here as an example at the location c6 and the location c7:

$$c6 = r11$$
$$c7 = r12$$

The result c of the multiplication of a and b is thus represented by the digits $(c_7 c_6 c_5 c_4 c_3 c_2 c_1 c_0)_{32}$ and stored in data memory 140 at the locations c0, c1, c2, c3, c4, c5, c6, and c7.

The output 280 of the multiplication program 151 is thus $(c_7 c_6 c_5 c_4 c_3 c_2 c_1 c_0)_{32}$.

According to the multiplication program 151, the calculation of the multiplication of the individual digits $a_3$, $a_2$, $a_1$, $a_0$, $b_3$, $b_2$, $b_1$, $b_0$ thus always takes place in registers r9 and r10, registers r11, r12 and r13 being used in rotating fashion to store the respective intermediate results $z_1, \ldots, z_7$. In each case, one of the registers r11, r12, r13 represents the lowest digit of the intermediate result $z_1, \ldots, z_7$, which is stored in data memory 140 as the digit of the result c. Subsequently, this register is used for the representation of the highest digit of the subsequently calculated intermediate result $z_1, \ldots, z_7$, and the other registers correspondingly move backwards in the sequence of digits. In this way, the number of registers used can be minimized.

The multiplication program 151 uses thirteen registers 120, . . . , 132. Here, three registers 120, . . . , 132 are [ . . . ] to store the digits of the first number a (r2, r3, r4), four registers 120, . . . , 132 to store the digits of the second number b (r5, r6, r7, r8), two registers 120, . . . , 132 to store the 32×32 bit multiplications performed in each case (r9, r10), three registers 120, . . . , 132 to store the intermediate results $z_1, \ldots, z_7$ (r11, 12, 13) and one register 120, . . , 132 to store the address of the result c in data memory 140 (r1). Further, the multiplication program 151 uses only eight memory accesses to data memory 140 to read in the digits of the first number a and the second number b, and only eight additional memory accesses to the data memory 140 to store the digits of the result c in data memory 140. Thus, both the number of registers 120, . . . , 132 used and the number of memory accesses are optimized. Computing device 1 is thus simple and inexpensive in design, but can still perform the required multiplication of the numbers a and b quickly and reliably.

To read in the digits from the first number a and the second number b, in each case an address pointer to the corresponding address of these digits in data memory 140 is necessary, analogous to r1. However, after reading in the digits of the numbers a, b, these addresses no longer have to be stored and can therefore be overwritten. Thus, no additional registers 120, . . . , 132 need to be reserved.

Due to the low requirements on computing device 1, it can be designed, for example, as a microprocessor with an ARM architecture.

The above multiplication allows the handling of two numbers with 128 bits. There can also be an extension to 256 bits while maintaining the basis of digit-by-digit multiplication. If two numbers with 256 bits are to be multiplied, eight additional registers 120, . . . , 132 are required. In this case, the first number a and the second number b each have 8 digits with 32 bits each, so that in addition to the first step 201, four additional digits must be loaded into a respective register 120, . . . , 132 for each number. Two registers 120, . . . , 132 are further used for digit-by-digit multiplication and three registers 120, . . . , 132 are further used for storing intermediate results; here more intermediate results are to be calculated than described above. In the case of 256-bit multiplication, sixteen memory accesses to data memory 140 are required to load the input values and sixteen memory accesses to data memory 140 are required to store the output values.

However, 21 registers 120, . . . , 132 are required for this extension. This complicates the design of computing device 1, as it must provide more registers than before. Also, further scaling to even larger numbers with more than 256 bits is practically unfeasible, in particular for computing devices for embedded systems, such as those preferably used in vehicles. If registers 120, . . . , 132 are swapped out by being swapped into data memory 140, losses of speed are to be expected.

It is therefore advantageous to divide the inputs a and b into 128 bit parts each. For example, the numbers a, b are to be multiplied to yield the result c:

$$a = (a7\ a6\ a5\ a4\ a3\ a2\ a1\ a0)_{32}$$
$$b = (b7\ b6\ b5\ b4\ b3\ b2\ b1\ b0)_{32}$$

In the following pseudocode, the previously described multiplication of second [sic: two] numbers with 128 bits is abbreviated as MULT128. The multiplication of the numbers a and b with 256 bits is then performed as follows:

$$(c7\ c6\ c5\ c4\ c3\ c2\ c1\ c0)_{32} =$$
$$MULT128((a3\ a2\ a1\ a0)_{32}, (b3\ b2\ b1\ b0)_{32})$$
$$(C01H\ C01L)_{128} = MULT128((a3\ a2\ a1\ a0)_{32}, (b7\ b6\ b5\ b4)_{32})$$
$$(C10H\ C10L)_{128} = MULT128((a7\ a6\ a5\ a4)_{32}, (b3\ b2\ b1\ b0)_{32})$$

-continued $$(C11H\ C11L)_{128} = MULT128((a7\ a6\ a5\ a4)_{32}, (b7\ b6\ b5\ b4)_{32})$$
$$(c12\ c11\ c10\ c9\ c8\ c7\ c6\ c5\ c4)_{32} =$$
$$(c7\ c6\ c5\ c4)_{32} + (C01H\ C01L)_{128} + (C10H\ C10L)_{128}$$
$$(c15\ c14\ c13\ c12\ c11\ c10\ c9\ c8)_{32} =$$
$$(c12\ c11\ c10\ c9\ c8)_{32} + (C11H\ C11L)_{128}$$

The output is the result c:

$$c = (c15\ c14\ c13\ c12\ c11\ c10\ c9\ c8\ c7\ c6\ c5\ c4\ c3\ c2\ c1\ c0)_{32}$$

Thus, the inputs are divided into 128 bit parts and then processed. Buffer memories C01, C10, and C11 in data memory 140 are used for this purpose. This requires an additional eight read accesses and eight memory accesses to data memory 140. This multiplication can be applied recursively in order to use larger bit lengths. For example, for a multiplication of numbers with 512 bits, the numbers can first be divided into parts with 256 bits and then into parts with 128 bits.

For an extension to larger bit lengths, a Karatsuba multiplication can also be used. Karatsuba multiplications are described in the related art. For this purpose, multiplications are replaced by additions. The basic idea of Karatsuba multiplications is as follows: The numbers a and b with 256 bits each are represented by $a=A1*2^{128}+A0$ and $b=B1*2^{128}+B0$. Thus, the result c is calculated as follows:

$$c = a*b = A1*B1*2^{256} + (A1*A0 + B1*B0)*2^{128} + A0*B0$$

The following holds:

$$A1*A0 + B1*B0 = (A1 - A0)*(B1 - B0) + A0*B0 + A1*B1$$

However, the last two summands are already known. Therefore, the calculation of A1*A0+B1*B0 can be solved with only one 128 bit multiplication and a plurality of additions instead of two 128 bit multiplications. Since multiplications require considerably more computational effort, this is mostly an advantage.

The multiplication of the numbers a and b with 256 bits is then performed as follows. First the calculation A0*B0 is performed and the result is designated C00:

$$(c7\ c6\ c5\ c4\ c3\ c2\ c1\ c0)_{32} =$$
$$MULT128((a3\ a2\ a1\ a0)_{32}, (b3\ b2\ b1\ b0)_{32}) = C00$$

This is done within the register 120, . . . , 132 without accessing data storage 140. Subsequently A1*B1 is calculated, the result in the [sic] being designated C11:

$$C11 = MULT128((a7\ a6\ a5\ a4)_{32}, (b7\ b6\ b5\ b4)_{32})$$

Then the calculation of (A1−A0) and of (B1−B0) takes place, the former result being designated A10 and the latter result B10. Subsequently, the two results are multiplied. This is followed by the addition of A0*B0 and A1*B1 and the inclusion of the largest 128 bits of the previously calculated A0*B0:

$$A10 = (a7\ a6\ a5\ a4)_{32} - (a3\ a2\ a1\ a0)_{32}$$
$$B10 = (b7\ b6\ b5\ b4)_{32} - (b3\ b2\ b1\ b0)_{32}$$
$$K = MULT128((A10, B10)$$

$$(c12\ c11\ c10\ c9\ c8\ c7\ c6\ c5\ c4)_{32} = (c7\ c6\ c5\ c4)_{32} + K + C11 + C00$$

Finally, C11, i.e. A1*B1, is added:

$$(c15\ c14\ c13\ c12\ c11\ c10\ c9\ c8)_{32} = (c12\ c11\ c10\ c9\ c8)_{32} + C11$$

In this case, for the calculations of A0*B0 and A1*B1 a total of 16 read accesses and 16 write accesses to data memory 140 are necessary. The subtractions for the calculation of A10 and B10 each require four read accesses (some of the digits are already in registers) and one write access (since all but one of the results of the subtraction are held in registers) to data memory 140. The multiplication of K requires one read access (since all but one of the digits are already in registers) and eight write accesses to data memory 140. The following additions require 28 read accesses and four write accesses to data memory 140 because (c12 c11 c10 c9 c8 c7 c6 c5 c4)$_{32}$ are held in the registers. The last addition step requires eight read accesses and eight write accesses to data memory 140. Thus, a total of 61 read accesses and 38 write accesses to data memory 140 are necessary.

This multiplication can be applied recursively to enable handling of larger bit lengths. For example, for a multiplication of numbers with 512 bits, the numbers can first be divided into parts with 256 bits and then into parts with 128 bits. Similarly, an addition and subtraction can be interchanged in order to assume, instead of A1*A0+B1*B0= (A1−A0)*(B1−B0)+A0*B0+A1*B1, the simplification A1*A0+B1*B0=(A1+A0) (B1+B0)−A0*B0−A1*B1.

FIG. 2 schematically shows the sequence of the squaring program 152. This program allows a multiplication of a number a having the digits $a_3 a_2 a_1 a_0$ by itself. The number a is a 128 bit number with four 32 bit digits each. Ten registers 120, . . . , 132 are used for this purpose.

The individual digits of the number to be squared, i.e. the values $a_3$, $a_2$, $a_1$, $a_0$, are stored in data memory 140 and are used as input 500 to squaring program 152. In a first step 501, each of these digits is read from data memory 140 into a respective register 120, . . . , 132, the registers 120, . . . , 132 being designated r1 through r5 in the following:

$$r2 = a_0, r3 = a_1, r4 = a_2, r5 = a_3$$

The calculation of the multiplication takes place in such a way that a plurality of intermediate results $z_1, \ldots, z_7$ are determined using the individual digits of the number a. These intermediate results $z_1, \ldots, z_7$ enable a calculation of the digits of the digits c of the multiplication.

The arithmetic logic unit 100 performs the following calculation steps, which are reproduced below as pseudo-code. Here:

ADD (u, v): The contents of registers u and v are added.

ADDX (u, v): The contents of registers u and v are added with carry. If the size of the register overflows due to a previous arithmetic operation, the value 1 is stored in a control register, otherwise the value 0. This value is added additionally during the ADDX operation.

MULT (u, v): The contents of registers u and v are multiplied.

In a second step 510, the arithmetic logic unit 100 is used to calculate a first intermediate result $z_1$ with the digits $t_0 c_0$ on the basis of the following schema $(t_0 c_0)_{32} a_0 * a_0$:

$$r12, r11 = MULT(r2, r2)$$

The first intermediate result $z_1$ already has a digit of the final result c, namely the digit $c_0$. Therefore, in a third step 511, this result is stored in data memory 140, here as an example at the location c0:

$$c0 = r11$$

After this, using arithmetic logic unit 100 a second intermediate result $z_2$ is calculated with the digits $t_2 t_1 c_1$ using the schema $(t_2 t_1 c_1)_{32} = t_0 + 2 * a_0 * a_1$. For this purpose, first the calculation $a_0 * a_1$ is performed in a fourth step 520 and is added twice to the value r12 $t_0$:

$$r10, r9 = MULT(r2, r3)$$
$$r12 = ADD(r9, r12)$$
$$r13 = ADDX(r10, 0)$$
$$r12 = ADD(r9, r12)$$
$$r13 = ADDX(r10, r13)$$
$$r11 = ADDX(0, 0)$$

After the fourth step 520 $t_2$ is stored in r11, $t_1$ in r13, and $c_1$ in r12, so that another digit of the result c is calculated. This digit $c_1$ is stored in data memory 140 in a fifth step 521, here as an example at location c1:

$$c1 = r12$$

Subsequently, with the arithmetic logic unit 100, a third intermediate result $z_3$ is calculated with the digits $t_4 t_3 c_2$ using the schema $(t_4 t_3 c_2)_{32} = (t_2 t_1)_{32} + 2 * a_0 * a_2 + a_1 * a_1$. For this purpose, first the calculation $a_0 * a_2$ is performed in a sixth step 530 and the result is added twice to $(t_2 t_1)_{32}$:

$$r10, r9 = MULT(r2, r4)$$
$$r13 = ADD(r9, r13)$$
$$r11 = ADDX(r10, r11)$$

-continued $$r12 = ADDX(0, 0)$$

$$r13 = ADD(r9, r13)$$

$$r11 = ADDX(r10, r11)$$

$$r12 = ADDX(0, r12)$$

Subsequently, in a seventh step 531 the calculation $a_1*a_1$ is performed and the addition thereof to the previously calculated values is carried out in order to obtain the third intermediate result $z_3=(t_4t_3c_2)_{32}$:

$$r10, r9 = MULT(r3, r3)$$

$$r13 = ADD(r9, r13)$$

$$r11 = ADDX(r10, r11)$$

$$r12 = ADDX(0, r12)$$

After the seventh step 231, $t_4$ is stored in r12, $t_3$ in r11, and $c_2$ in r13, so that another digit of the result c is calculated. This digit $c_2$ is stored in data memory 140 in an eighth step 532, here as an example at location c2:

$$c2 = r13$$

Subsequently, the arithmetic logic unit 100 is used to calculate a fourth intermediate result $z_4$ with the digits $t_6t_5c_3$ using the schema $(t_6t_5c_3)_{32}=(t_4t_3)_{32}+2*(a_0*a_3+a_1*a_2)$. For this purpose, first the calculation $a_0*a_3$ is performed in a ninth step 540:

$$r7, r6 = MULT(r2, r5)$$

Subsequently, in a tenth step 541, the calculation $a_1*a_2$ is performed and the addition of the result to the result of the previous multiplication is carried out, thus the calculation of $a_0*a_3+a_1*a_2$:

$$r10, r9 = MULT(r3, r4)$$

$$r6 = ADD(r9, r6)$$

$$r7 = ADDX(r10, r7)$$

$$r8 = ADDX(0, r8)$$

Subsequently, in an eleventh step 542 the previously determined result is doubled:

$$r6 = ADD(r6, r6)$$

$$r7 = ADDX(r7, r7)$$

$$r8 = ADDX(r8, r8)$$

Next, in a twelfth step 543 the previously calculated result is added to $(t_4t_3)_{32}$ to obtain the fourth intermediate result $z_4=(t_6t_5c_3)_{32}$:

$$r11 = ADD(r6, r11)$$

$$r12 = ADDX(r7, r12)$$

$$r13 = ADDX(r8, 0)$$

After the twelfth step 543, $t_6$ is stored in r13, $t_5$ in r12 and $c_3$ in r11, so that another digit of the result c is calculated. This digit $c_3$ is stored in data memory 140 in a thirteenth step 544, here as an example at location c3:

$$c3 = r11$$

Subsequently, arithmetic logic unit 100 is used to calculate a fifth intermediate result $z_5$ with the digits $t_8t_7c_4$ using the schema $(t_8t_7c_4)_{32}=(t_6t_5)_{32}+2*a_1*a_3+a_2*a_2$. For this purpose, the calculation $a_1*a_3$ is first performed in a fourteenth step 550 and the result is added twice to $(t_6t_5)_{32}$:

$$r10, r9 = MULT(r3, r5)$$

$$r12 = ADD(r9, r12)$$

$$r13 = ADDX(r10, r13)$$

$$r11 = ADDX(0, 0)$$

$$r12 = ADD(r9, r12)$$

$$r13 = ADDX(r10, r13)$$

$$r11 = ADDX(0, r11)$$

Then, in a fifteenth step 551, the calculation $a_2*a_2$ is made and the addition thereof to the previously calculated values is carried out:

$$r10, r9 = MULT(r4, r4)$$

$$r12 = ADD(r9, r12)$$

$$r13 = ADDX(r10, r13)$$

$$r11 = ADDX(0, r11)$$

After the fifteenth step 551, $t_8$ is stored in r11, $t_7$ in r13, and $c_4$ in r12, so that another digit of the result c is calculated. This digit $c_4$ is stored in data memory 140 in a sixteenth step 552, here as an example at location c4:

$$c4 = r12$$

Subsequently, arithmetic logic unit 100 is used to calculate a sixth intermediate result $z_6$ with the digits $t_{10}t_9c_5$ using the schema $(t_{10}t_9c_5)_{32}=(t_8t_7)_{32}+2*a_2*a_3$. For this purpose, in a seventeenth step 560 the calculation $a_2*a_3$ is carried out and the result is added twice to $(t_7t_8)_{32}$:

$$r10, r9 = MULT(r4, r5)$$

$$r13 = ADD(r9, r13)$$

-continued $$r11 = ADDX(r10, r11)$$

$$r12 = ADDX(0, 0)$$

$$r13 = ADD(r9, r13)$$

$$r11 = ADDX(r10, r11)$$

$$r12 = ADDX(0, r12)$$

After the seventeenth step 560, $t_{10}$ is stored in r12, $t_9$ in r11, and $c_5$ in r13, so that another digit of the result c is calculated. This digit $c_5$ is stored in data memory 140 in an eighteenth step 561, here as an example at the location c5:

$$c5 = r13$$

Subsequently, with the arithmetic logic unit 100 a seventh intermediate result $z_7$ is calculated with the digits $c_7c_6$ using the schema $(c_7c_6)_{32}=(t_{10}t_9)_{32}+a_3*a_3$. Thus, in a nineteenth step 570, a calculation of $a_3*a_3$ is made and the subsequent addition to $(t_{10}t_9)_{32}$ takes place:

$$r10, r9 = MULT(r5, r5)$$

$$r11 = ADD(r9, r13)$$

$$r12 = ADDX(r10, r11)$$

Subsequently, $c_6$ is stored in r11 and $c_7$ in r12, so that in a final, twentieth step 571 these digits $c_6$ and $c_7$ are stored in data memory 140, here as an example at location c6 and location c7:

$$c6 = r11$$

$$c7 = r12$$

The result c of the multiplication of a with itself is thus represented by the digits $(c_7c_6c_5c_4c_3c_2c_1c_0)_{32}$ and is stored in data memory 140 at locations c0, c1, c2, c3, c4, c5, c6 and c7. The output 580 of the squaring program 152 is thus $(c_7c_6c_5c_4c_3c_2c_1c_0)_{32}$ According to the squaring program 152, the calculation of the multiplication of the individual digits $a_3$, $a_2$, $a_1$, $a_0$ is thus always performed in registers r9 and r10, registers r11, r12 and r13 being used in rotating fashion to store the respective intermediate results $z_1$, ..., $z_7$. In each case, one of the registers r11, r12, r13 represents the lowest digit of the intermediate result $z_1$, ..., $z_7$, which is stored in data memory 140 as the digit of the result c. Subsequently, this register is used for the representation of the highest digit of the subsequently calculated intermediate result $z_1$, ..., $z_7$, and the other registers correspondingly move backwards in the sequence of digits. In this way, the number of registers used can be minimized. To accelerate the calculation of the fourth intermediate result $z_4$, the registers r6, r7 and r8 are additionally used. These three registers are used to together double the two multiplications that are to be calculated for the fourth intermediate result $z_4$. This results in a faster calculation. Alternatively, these three registers can be omitted, in which case the individual multiplications would each have to be added twice to the previous results. This leads to an additional addition calculation, which can be dispensed with by using the three additional registers. If the computing device 1 is already designed to also execute the multiplication program 151, then these additional registers are available anyway, and therefore a speed advantage is gained by using them.

The squaring program 152 uses ten registers 120, ..., 132. Here, four registers 120, ..., 132 are [sic][1] for storing the digits of the number a (r2, r3, r4, r5), two registers 120, ..., 132 for storing the 32×32 bit multiplications performed in each case (r9, r10), three registers 120, ..., 132 for storing the intermediate results $z_1$, ..., $z_7$ (r11, 12, 13), three registers 120, ..., 132 for the speed optimization as described above (r6, r7, r8), and one register 120, ..., 132 for storing the address of the result c in the data memory 140 (r1). Further, the squaring program 152 uses only four memory accesses to the data memory 140 to read in the digits of the number a, and only eight additional memory accesses to the data memory 140 to store the digits of the result c in the data memory 140. Thus, both the number of registers 120, ..., 132 used and the number of memory accesses are optimized. Computing device 1 is thus simple and inexpensive in design, but can still perform the required squaring of the number a quickly and reliably. Since fewer operations and fewer memory accesses are required than for the multiplication program 151, a separate implementation of the squaring program 152 is advantageous.

[1][Translator's note: The verb appears to be missing in the original German.]

Figure 4:
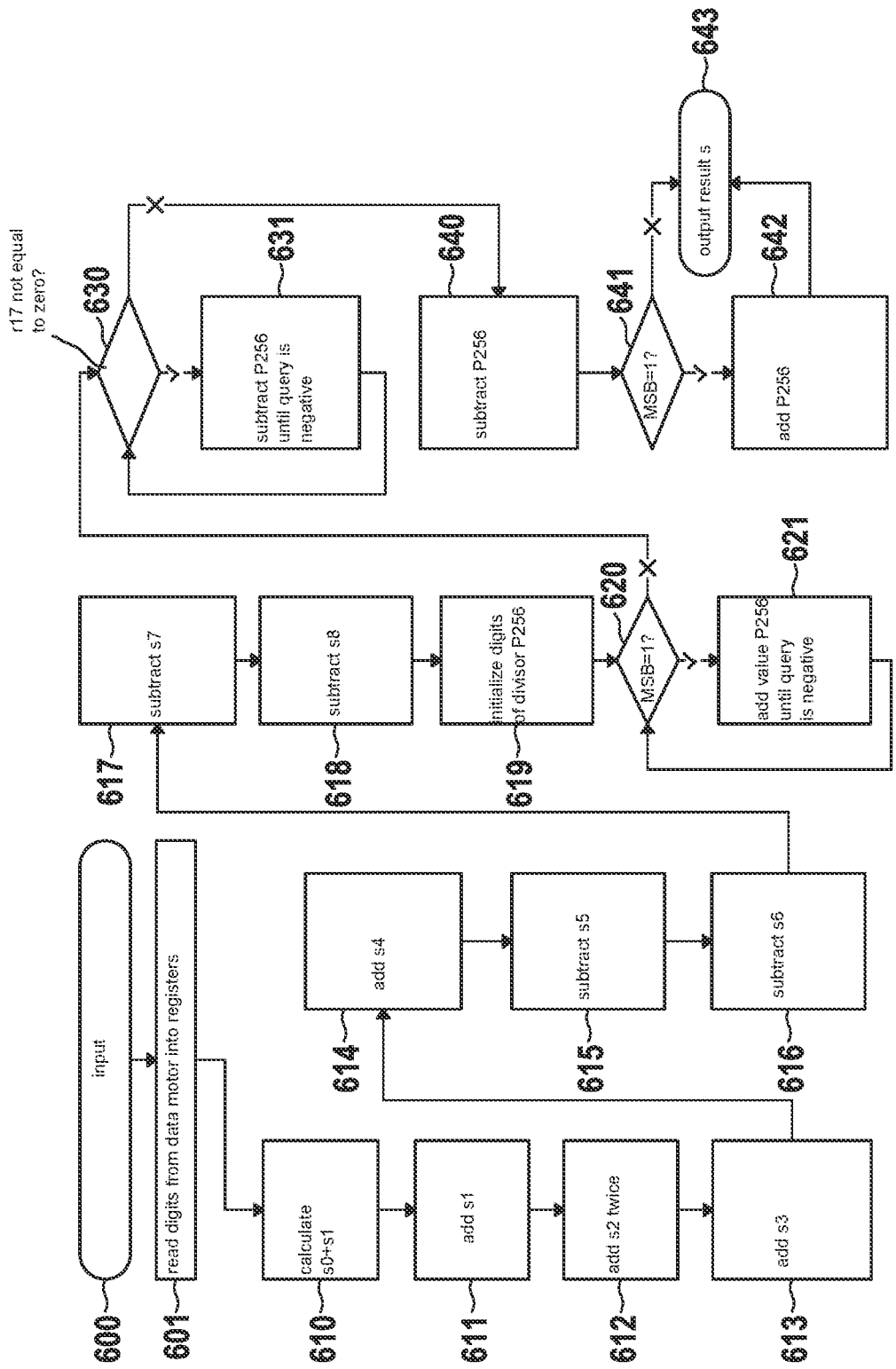
FIG. 4 shows a schematic flowchart of a division calculation with remainder by the computing device according to an example embodiment of the present invention.

FIG. 4 schematically shows the sequence of the modulo program 153. This program enables the calculation of a remainder of a division of a 512-bit number, formed by the 32-bit digits $a_{15}a_{14}a_{13}a_{12}a_{11}a_{10}a_9a_8a_7a_6a_5a_4a_3a_2a_1a_0$, with the 256-bit divisor P256, where $P256=2^{256}-1^{224}+2^{192}+2^{192}+2^{96}-1$ holds. Seventeen registers 120, ... 132 are used for this purpose, although it should be noted that not all of these registers are shown in FIG. 1.

The individual digits of the number to be divided, i.e. the values $a_{15}$, $a_{14}$, $a_{13}$, $a_{12}$, $a_{11}$, $a_{10}$, $a_9$, $a_8$, $a_7$, $a_6$, $a_5$, $a_4$, $a_3$, $a_2$, $a_1$, $a_0$, are stored in data memory 140 and are used as $a_1a_0$ input 600 of the modulo program 153. In a first step 601, each of these digits is read from data memory 140 into a respective register 120, ..., 132, the registers 120, 132 being designated r1 through r16 in the following:

$$r1 = a_0, r2 = a_1, r3 = a_2, r4 = a_3, r5 = a_4, r6 = a_5,$$

$$r7 = a_6, r8 = a_7, r9 = a_8, r10 = a_9, r11 = a_{10},$$

$$r12 = a_{11}, r13 = a_{12}, r14 = a_{13}, r15 = a_{14}, r16 = a_{15}$$

Another register 120, ... 132, designated r17 in the following, is used for the calculation. This register is used to collect the carries of the calculation steps.

The calculation of the remainder of the division is done according to the following schema:

$$s = s_0 + 2s_1 + 2s_2 + s_3 + s_4 - s_5 - s_6 - s_7 - s_8$$

where the auxiliary numbers $s_0$, $s_0$, $s_1$, $s_2$, $s_3$, $s_4$, $s_5$, $s_6$, $s_7$, $s_8$ have the following digits:

$$s_0 = (a_7 \ a_6 \ a_5 \ a_4 \ a_3 \ a_2 \ a_1 \ a_0)_{32}$$

$$s_1 = (a_{15} \ a_{14} \ a_{13} \ a_{12} \ a_{11} \ 0 \ 0 \ 0)_{32}$$

$$s_2 = (0 \ a_{15} \ a_{14} \ a_{13} \ a_{12} \ 0 \ 0 \ 0)_{32}$$

$$s_3 = (a_{15} \ a_{14} \ 0 \ 0 \ 0 \ a_{10} \ a_9 \ a_8)_{32}$$

-continued $$s_4 = (a_8 \; a_{13} \; a_{15} \; a_{14} \; a_{13} \; a_{11} \; a_{10} \; a_9)_{32}$$

$$s_5 = (a_{10} \; a_8 \; 0 \; 0 \; 0 \; a_{13} \; a_{12} \; a_{11})_{32}$$

$$s_6 = (a_{11} \; a_9 \; 0 \; 0 \; a_{15} \; a_{14} \; a_{13} \; a_{12})_{32}$$

$$s_7 = (a_{12} \; 0 \; a_{10} \; a_9 \; a_8 \; a_{15} \; a_{14} \; a_{13})_{32}$$

$$s_8 = (a_{13} \; 0 \; a_{11} \; a_{10} \; a_9 \; 0 \; a_{15} \; a_{14})_{32}$$

The arithmetic logic unit 100 performs the following calculation steps, which are reproduced below as pseudocode. Here:

ADD (u, v): The contents of registers u and v are added.

ADDX (u, v): The contents of registers u and v are added with carry. If the size of the register overflows due to a previous arithmetic operation, the value 1 is stored in a control register, otherwise the value 0. This value is added additionally during the ADDX operation.

SUB (u, v): The content of register v is subtracted from the content of register u.

SUBX (u, v): The content of register v is subtracted from the content of register u with carry. If the size of the register overflows due to a previous calculation operation, the value 1 is stored in a control register, otherwise the value 0. This value is additionally subtracted during the SUBX operation.

In a second step 610 and a third step 611, the arithmetic logic unit 100 calculates the addition $s_0+2s_1$, where this is divided into the second step $s_0+s_1$ and the third step: $(s_0+s_1)+s_1$ In the second step 610, the arithmetic logic unit 100 calculates the addition $s_0+s_1$:

$$r4 = ADD(r4, r12)$$
$$r5 = ADDX(r5, r13)$$
$$r6 = ADDX(r6, r14)$$
$$r7 = ADDX(r7, r15)$$
$$r8 = ADDX(r8, r16)$$
$$r17 = ADDX(0, 0)$$

Here the resulting carry is collected in the r17 register. Since some values of $s_1$ have the value 0, no addition of these values is necessary. Furthermore, it can be seen that all necessary operands are already stored in the registers, as is also the case in subsequent steps, so that memory operations, i.e. in particular accesses to data memory 140, are not necessary. In the third step 611, the arithmetic logic unit 100 performs the addition of $s_1$:

$$r4 = ADD(r4, r12)$$
$$r5 = ADDX(r5, r13)$$
$$r6 = ADDX(r6, r14)$$
$$r7 = ADDX(r7, r15)$$
$$r8 = ADDX(r8, r16)$$
$$r17 = ADDX(r17, 0)$$

Again, the resulting carry is collected in register r17. In a fourth step 612, the addition of $s_2$ by the arithmetic logic unit 100 is done twice:

$$r4 = ADD(r4, r13)$$
$$r5 = ADDX(r5, r14)$$
$$r6 = ADDX(r6, r15)$$
$$r7 = ADDX(r7, r16)$$
$$r8 = ADDX(r8, 0)$$
$$r17 = ADDX(r17, 0)$$
$$r4 = ADD(r4, r13)$$
$$r5 = ADDX(r5, r14)$$
$$r6 = ADDX(r6, r15)$$
$$r7 = ADDX(r7, r16)$$
$$r8 = ADDX(r8, 0)$$
$$r17 = ADDX(r17, 0)$$

Again, the resulting carry is collected in register r17. In a fifth step 613, the addition of $s_3$ by the arithmetic logic unit 100 takes place:

$$r1 = ADD(r1, r9)$$
$$r2 = ADDX(r2, r10)$$
$$r3 = ADDX(r3, r11)$$
$$r4 = ADDX(r4, 0)$$
$$r5 = ADDX(r5, 0)$$
$$r6 = ADDX(r6, 0)$$
$$r7 = ADDX(r7, r15)$$
$$r8 = ADDX(r8, r16)$$
$$r17 = ADDX(r17, 0)$$

Again, the resulting carry is collected in register r17. In a sixth step 614, the addition of $s_4$ by the arithmetic logic unit 100 takes place:

$$r1 = ADD(r1, r10)$$
$$r2 = ADDX(r2, r11)$$
$$r3 = ADDX(r3, r12)$$
$$r4 = ADDX(r4, r14)$$
$$r5 = ADDX(r5, r15)$$
$$r6 = ADDX(r6, r16)$$
$$r7 = ADDX(r7, r14)$$
$$r8 = ADDX(r8, r9)$$
$$r17 = ADDX(r17, 0)$$

Again, the resulting carry is collected in register r17. In a seventh step 615, the subtraction of $s_5$ by the arithmetic logic unit 100 takes place:

$$r1 = SUB(r1, r12)$$
$$r2 = SUBX(r2, r13)$$
$$r3 = SUBX(r3, r14)$$
$$r4 = SUBX(r4, 0)$$
$$r5 = SUBX(r5, 0)$$
$$r6 = SUBX(r6, 0)$$
$$r7 = SUBX(r7, r9)$$
$$r8 = SUBX(r8, r10)$$
$$r17 = SUBX(r17, 0)$$

In the subtraction as well, the resulting carry is collected in register r17. In an eighth step 616, the subtraction of $s_6$ by the arithmetic logic unit 100 takes place:

$$r1 = SUB(r1, r13)$$
$$r2 = SUBX(r2, r14)$$
$$r3 = SUBX(r3, r15)$$
$$r4 = SUBX(r4, r16)$$
$$r5 = SUBX(r5, 0)$$
$$r6 = SUBX(r6, 0)$$
$$r7 = SUBX(r7, r10)$$
$$r8 = SUBX(r8, r11)$$
$$r17 = SUBX(r17, 0)$$

Again, the resulting carry is collected in register r17. In a ninth step 617, the subtraction of $s_7$ by the arithmetic logic unit 100 takes place:

$$r1 = SUB(r1, r14)$$
$$r2 = SUBX(r2, r15)$$
$$r3 = SUBX(r3, r16)$$
$$r4 = SUBX(r4, r9)$$
$$r5 = SUBX(r5, r10)$$
$$r6 = SUBX(r6, r11)$$
$$r7 = SUBX(r7, 0)$$
$$r8 = SUBX(r8, r13)$$
$$r17 = SUBX(r17, 0)$$

Again, the resulting carry is collected in register r17. In a tenth step 618, the subtraction of $s_8$ by the arithmetic logic unit 100 takes place:

$$r1 = SUB(r1, r15)$$
$$r2 = SUBX(r2, r16)$$
$$r3 = SUBX(r3, 0)$$
$$r4 = SUBX(r4, r10)$$
$$r5 = SUBX(r5, r11)$$
$$r6 = SUBX(r6, r12)$$
$$r7 = SUBX(r7, 0)$$
$$r8 = SUBX(r8, r14)$$
$$r17 = SUBX(r17, 0)$$

Again, the resulting carry is collected in register r17. Thus the calculation $s = s_0 + 2s_1 + 2s_2 + s_3 + s_4 - s_5 - s_6 - s_7 - s_8$ has been carried out completely; however, the collected carries still have to be taken into account. At this time, registers r9 to r16 are no longer needed. Therefore, in an eleventh step 619, an initialization of the individual digits of the divisor P256 takes place in these registers r9 to r16:

$$r9 = FFFFFFFF$$
$$r10 = FFFFFFFF$$
$$r11 = FFFFFFFF$$
$$r12 = 00000000$$
$$r13 = 00000000$$
$$r14 = 00000000$$
$$r15 = 00000001$$
$$r16 = FFFFFFFF$$

In a twelfth step 620, it is queried whether the bit with the highest bit significance, also called the most significant bit, abbreviated MSB, of register r17 is equal to 1. If this is the case, the calculated result s is negative. In this case, a thirteenth step 621, in which the arithmetic logic unit 100 adds the value P256, is carried out until the query in the twelfth step 620 is negative:

$$r1 = ADD(r1, r9)$$
$$r2 = ADDX(r2, r10)$$
$$r3 = ADDX(r3, r11)$$
$$r4 = ADDX(r4, r12)$$
$$r5 = ADDX(r5, r13)$$
$$r6 = ADDX(r6, r14)$$
$$r7 = ADDX(r7, r15)$$
$$r8 = ADDX(r8, r16)$$
$$r17 = ADDX(r17, 0)$$

If the query is answered in the negative in the twelfth step 620, the result s is positive. Subsequently, in a fourteenth step 630, a query is made whether the content of register r17 is not equal to the value 0. If this is the case, then there is an overflow and the result s is greater than P256. Therefore, a fifteenth step 631, in which the value is P256 is subtracted, then takes place until the query in the fourteenth step 630 is negative:

$$r1 = SUB(r1, r9)$$
$$r2 = SUBX(r2, r10)$$
$$r3 = SUBX(r3, r11)$$
$$r4 = SUBX(r4, r12)$$
$$r5 = SUBX(r5, r13)$$
$$r6 = SUBX(r6, r14)$$
$$r7 = SUBX(r7, r15)$$
$$r8 = SUBX(r8, r16)$$
$$r17 = SUBX(r17, 0)$$

If the query in the fourteenth step 630 is negative, then there is no longer a carry and, in a sixteenth step 640, the arithmetic logic unit 100 performs a subtraction of the value P256 in order to ensure that the result s is less than P256:

$$r1 = SUB(r1, r9)$$
$$r2 = SUBX(r2, r10)$$
$$r3 = SUBX(r3, r11)$$
$$r4 = SUBX(r4, r12)$$
$$r5 = SUBX(r5, r13)$$
$$r6 = SUBX(r6, r14)$$
$$r7 = SUBX(r7, r15)$$
$$r8 = SUBX(r8, r16)$$
$$r17 = SUBX(r17, 0)$$

If the result of the query of the fourteenth step 630 is negative, then the result s is a positive value and is less than P256, but may still be greater than P256. The subtraction in the sixteenth step 640 ensures that the result s is smaller than P256. However, this can cause the result s to become negative again, namely if s was previously already smaller than P256. Therefore, in a final query in a seventeenth step 641, it is queried whether the MSB of register r17 is equal to 1. If the response to this is negative, the condition 0<s<P256 obtains and the registers r1, r2, r3, r4, r5, r6, r7, r8 are provided as final result as output 643 of the modulo program 153. For example, the values of these registers may be loaded into data memory 140. It should be noted that the highest digit of the result s is stored in register r8, with registers r7 to r1 reflecting the corresponding lower digits:

$$s = (r8 \ r7 \ r6 \ r5 \ r4 \ r3 \ r2 \ r1)_{32}.$$

If the query is answered in the affirmative in the seventeenth step 641, the result s is negative, and the arithmetic logic unit 100, in an eighteenth step 642, performs an addition with the value P256 in order to undo the sixteenth step 640 and subsequently to provide the result s as output 643:

$$r1 = ADD(r1, r9)$$
$$r2 = ADDX(r2, r10)$$
$$r3 = ADDX(r3, r11)$$
$$r4 = ADDX(r4, r12)$$
$$r5 = ADDX(r5, r13)$$
$$r6 = ADDX(r6, r14)$$
$$r7 = ADDX(r7, r15)$$
$$r8 = ADDX(r8, r16)$$
$$r17 = ADDX(r17, 0)$$

The result s provided as output 643 is thus guaranteed to be positive and less than P256. Due to modulo program 153, the computing device 1 is very efficient and simple in its design. Only sixteen accesses to data memory 140 are required to read input 600, and eight accesses to data memory 140 are required to store output 643. To perform the calculation, one register 120, . . . , 132 is needed as a stack pointer and seventeen registers 120, . . . , 132 are needed for the calculation. The computing device 1 is thus optimized for performing modulo calculations, in particular with minimized memory access. In particular, the computation based on the prime number P256 can be calculated easily and with little effort, which is advantageous for elliptic curve cryptography using the NIST-P256 curve.

What is claimed is:

1. A computing device configured to check a software key of a user terminal device in a keyless vehicle access system, the computing device comprising:
   an arithmetic logic unit;
   a plurality of registers having a storage capacity of at least x bits; and
   a data memory;
   wherein:
   the computing device is configured to carry out a multiplication of two y-bit numbers each of the y-bit numbers being formed by a plurality of x-bit digits, the computing device being configured to:
   load the x-bit digits of the y-bit numbers into the registers, and
   repeatedly calculate, using the arithmetic logic unit, for all x-bit digits of a result of the multiplication of the y-bit numbers, an x-bit digit of the result based on those of the registers that store the associated x-bit digits of the y-bit numbers, and store the calculated x-bit digit of the result in the data memory; and y is an integer multiple of x;
   wherein a first number a is represented by digits $a_3 a_2 a_1 a_0$ and a second number b by digits $b_3 b_2 b_1 b_0$, the computing device being configured to:
   calculate, with the arithmetic logic unit, a first intermediate result $z_1$ with digits $t_0 c_0$ based on the following schema and store $c_i$ in the data memory:

$$t_0 c_0 = a_0 * b_0$$

calculate, with the arithmetic logic unit, a second intermediate result $z_2$ with digits $t_2t_1c_1$ based on the following schema and store c in the data memory:

$$t_2t_1c_1 = t_0 + a_0 * b_1 + a_1 * b_0$$

calculate, with the arithmetic logic unit, a third intermediate result $z_3$ with digits $t_4t_3c_2$ based on the following schema and store $c_2$ in the data memory:

$$t_4t_3c_2 = t_2t_1 + a_0 * b_2 + a_1 * b_1 + a_2 * b_0$$

calculate, with the arithmetic logic unit, a fourth intermediate result $z_4$ with digits $t_6t_5c_3$ based on the following schema and store $c_3$ in the data memory:

$$t_6t_5c_3 = t_4t_3 + a_0 * b_3 + a_1 * b_2 + a_2 * b_1 + a_3 * b_0$$

calculate, with the arithmetic logic unit, a fifth intermediate result $z_5$ with digits $t_8t_7c_4$ based on the following schema and store $c_4$ in the data memory:

$$t_8t_7c_4 = t_6t_5 + a_1 * b_3 + a_2 * b_2 + a_3 * b_1$$

calculate, with the arithmetic logic unit, a sixth intermediate result $z_6$ with digits $t_{10}t_9c_5$ based on the following schema and store $c_5$ in the data memory:

$$t_{10}t_9c_5 = t_8t_7 + a_2 * b_3 + a_3 * b_2$$

calculate, with the arithmetic logic unit, a seventh intermediate result $z_7$ with digits $c_7c_6$ based on the following schema and store $c_7c_6$ in the data memory:

$$c_7c_6 = t_{10}t_9 + a_3 * b_3$$

a result c of the multiplication of a and b being represented by the digits $c_7c_6c_5c_4c_3c_2c_1c_0$.

2. The computing device as recited in claim 1, wherein x=32 bits and y=128 bits.

3. The computing device as recited in claim 1, wherein at least the digits of the second intermediate result, the digits of the third intermediate result, the digits of the fourth intermediate result, the digits of the fifth intermediate result, and the digits of the sixth intermediate result are stored in the same registers, the computing device being configured to use the register that stores a lowest digit of an intermediate result for storing a highest digit of the subsequent intermediate result.

4. The computing device as recited in claim 1, wherein the computing device is configured to load only the three lowest digits of the first number a or of the second number b in each case into the registers for the calculation of the first intermediate result, the second intermediate result, and the third intermediate result.

5. The computing device as recited in claim 4, wherein, for calculating the fourth intermediate result, the fifth intermediate result, the sixth intermediate result, and the seventh intermediate result, the computing device is configured to load the respective highest digit of the first number a or of the second number b that is not loaded into the registers for calculating the preceding intermediate results into the register in which the lowest digit of the same number is stored.

6. A computing device configured to check a software key of a user terminal device in a keyless vehicle access system, the computing device comprising:
an arithmetic logic unit;
a plurality of registers having a storage capacity of at least x bits; and
a data memory;
wherein:
the computing device is configured to carry out a multiplication of two y-bit numbers each of the y-bit numbers being formed by a plurality of x-bit digits, the computing device being configured to:
load the x-bit digits of the y-bit numbers into the registers, and
repeatedly calculate, using the arithmetic logic unit, for all x-bit digits of a result of the multiplication of the y-bit numbers, an x-bit digit of the result based on those of the registers that store the associated x-bit digits of the y-bit numbers, and store the calculated x-bit digit of the result in the data memory; and
y is an integer multiple of x;
wherein the multiplication is a squaring of a number a represented by digits $a_3a_2a_1a_0$, the computing device being configured to:
calculate, with the arithmetic logic unit, a first intermediate result $z_1$ with digits $t_0c_0$ based on the following schema and store $c_0$ in the data memory:

$$t_0c_0 = a_0 * a_0$$

calculate, with the arithmetic logic unit, a second intermediate result $z_2$ with digits $t_2t_1c_1$ based on the following schema and store $c_1$ in the data memory:

$$t_2t_1c_1 = t_0 + 2 * a_0 * a_1$$

calculate, with the arithmetic logic unit, a third intermediate result $z_3$ with digits $t_4t_3c_2$ based on the following schema and store $c_2$ in the data memory:

$$t_4t_3c_2 = t_2t_1 + 2 * a_0 * a_2 + a_1 * a_1$$

calculate, with the arithmetic logic unit, a fourth intermediate result $z_4$ with digits $t_6t_5c_3$ based on the following schema and store $c_3$ in the data memory:

$$t_6t_5c_3 = t_4t_3 + 2 * (a_0 * a_3 + a_1 * a_2)$$

calculate, with the arithmetic logic unit, a fifth intermediate result $z_5$ with digits $t_8 t_7 c_4$ based on the following schema and store $c_4$ in the data memory:

$$t_8 t_7 c_4 = t_6 t_5 + 2 * a_1 * a_3 + a_2 * a_2$$

calculate, with the arithmetic logic unit, a sixth intermediate result $z_6$ with digits $t_{10} t_9 c_5$ based on the following schema and store $c_5$ in the data memory:

$$t_{10} t_9 c_5 = t_8 t_7 + 2 * a_2 * a_3$$

calculate, with the arithmetic logic unit, a seventh intermediate result $z_7$ with the digits $c_7 c_6$ on the basis of the following schema and store $c_7 c_6$ in the data memory:

$$c_7 c_6 = t_{10} t_9 + a_3 * a_3$$

where result c of the squaring of a is represented by the digits $c_7 c_6 c_5 c_4 c_3 c_2 c_1 c_0$.

7. A computing device configured to check a software key of a user terminal device in a keyless vehicle access system, the computing device comprising:
an arithmetic logic unit;
a plurality of registers each having a storage capacity of at least 32 bits; and
a data memory;
wherein:
the computing device is configured to calculate a remainder of a division of a 512-bit number, which is formed by 32-bit digits $a_{15} a_{14} a_{13} a_{12} a_{11} a_{10} a_9 a_8 \ a_7 a_6 a_5 a_4 a_3 a_2 a_1 a_0$, with a 256-bit divisor P256, where $P256 = 2^{256} - 2^{224} + 2^{192} + 2^{96} - 1$ holds, in that the computing device is configured to:
load the 32-bit digits of the 512-bit number into the registers, and
using the arithmetic logic unit, repeatedly calculate the remainder of the division based on the following schema and store s as a result in the data memory:

$$s = s_0 + 2s_1 + 2s_2 + s_3 + s_4 - s_5 - s_6 - s_7 - s_8$$

the auxiliary numbers $s_0$, $s_0$, $s_1$, $s_2$, $s_3$, $s_4$, $s_5$, $s_6$, $s_7$, $s_8$ having the following digits:

$$s_0 = (a_7 \ a_6 \ a_5 \ a_4 \ a_3 \ a_2 \ a_1 \ a_0)_{32}$$

$$s_1 = (a_{15} \ a_{14} \ a_{13} \ a_{12} \ a_{11} \ 0 \ 0 \ 0)_{32}$$

$$s_2 = (0 \ a_{15} \ a_{14} \ a_{13} \ a_{12} \ 0 \ 0 \ 0)_{32}$$

$$s_3 = (a_{15} \ a_{14} \ 0 \ 0 \ 0 \ a_{10} \ a_9 \ a_8)_{32}$$

$$s_4 = (a_8 \ a_{13} \ a_{15} \ a_{14} \ a_{13} \ a_{11} \ a_{10} \ a_9)_{32}$$

$$s_5 = (a_{10} \ a_8 \ 0 \ 0 \ 0 \ a_{13} \ a_{12} \ a_{11})_{32}$$

$$s_6 = (a_{11} \ a_9 \ 0 \ 0 \ a_{15} \ a_{14} \ a_{13} \ a_{12})_{32}$$

$$s_7 = (a_{12} \ 0 \ a_{10} \ a_9 \ a_8 \ a_{15} \ a_{14} \ a_{13})_{32}$$

$$s_8 = (a_{13} \ 0 \ a_{11} \ a_{10} \ a_9 \ 0 \ a_{15} \ a_{14})_{32}.$$

8. The computing device as recited in claim 7, further comprising a non-volatile memory for storing program data, the program data, when executed by the computing device, causing the computing device to calculate the remainder of a division and/or a multiplication and/or a squaring.

9. The computing device as recited in claim 7, wherein the computing device is configured to
determine, based on a register used as an auxiliary register, that the result s is greater than P256 and repeatedly perform a subtraction s=s−P256 until the result s is smaller than P256, and/or
based on a register used as an auxiliary register, determine that the result s is a negative number and repeatedly perform an addition s=s+P256 until the result s is a positive number.

* * * * *